C. H. HAPGOOD.
REFRIGERATING APPARATUS.
APPLICATION FILED OCT. 10, 1913.

1,200,878.

Patented Oct. 10, 1916.
7 SHEETS—SHEET 1.

C. H. HAPGOOD.
REFRIGERATING APPARATUS.
APPLICATION FILED OCT. 10, 1913.

1,200,878.

Patented Oct. 10, 1916.
7 SHEETS—SHEET 3.

Witnesses:

Inventor
Cyrus H. Hapgood
by Jas. H. Churchill
Atty.

C. H. HAPGOOD.
REFRIGERATING APPARATUS.
APPLICATION FILED OCT. 10, 1913.

1,200,878.

Patented Oct. 10, 1916.
7 SHEETS—SHEET 4.

Witnesses:
Ernst A. Telfer
J. Murphy

Inventor
Cyrus H. Hapgood
by Jas. H. Churchill
Atty

C. H. HAPGOOD.
REFRIGERATING APPARATUS.
APPLICATION FILED OCT. 10, 1913.

1,200,878.

Patented Oct. 10, 1916.
7 SHEETS—SHEET 5.

UNITED STATES PATENT OFFICE.

CYRUS H. HAPGOOD, OF MONTCLAIR, NEW JERSEY.

REFRIGERATING APPARATUS.

1,200,878.

Specification of Letters Patent.

Patented Oct. 10, 1916.

Application filed October 10, 1913. Serial No. 794,505.

*To all whom it may concern:*

Be it known that I, CYRUS H. HAPGOOD, a citizen of the United States, residing in Montclair, in the county of Essex and State of New Jersey, have invented an Improvement in Refrigerating Apparatus, of which the following description, in connection with the accompanying drawings, is a specification, like characters on the drawings representing like parts.

This invention relates to a refrigerating apparatus, and has for its object to provide an apparatus in which a stationary expansion chamber is included in a hermetically sealed circuit for the refrigerant, which is circulated by a piston movable in the hermetically sealed circuit by means extraneous thereto, without breaking the seal of said circuit, thereby avoiding the use of stuffing boxes and the disagreeable results and necessary attendance which flow from the use of stuffing boxes in a refrigerating system or apparatus; and also providing for automatic lubrication and the protection of the working parts from being tampered with; and further enabling the stationary expansion chamber to be made of any desired size and accessible for repairs.

In the present instance I have shown one embodiment of the invention, in which magnetic means are employed to move the piston in the hermetically sealed circuit. The piston and the magnetic means constitute a magnetically operated pump, which may and preferably will be made as herein shown, and is supported by a stationary substantially fluid tight casing, as will be described. Provision is made for lubricating the pump, as will be described. The magnetic means is shown as solenoids, and provision is made for alternately energizing the solenoids, as will be described.

These and other features of this invention will be pointed out in the claims at the end of this specification.

In the embodiment of the invention herein shown, 10 represents a casing, which is closed at its bottom and sides and open at its top, and has removably secured to it by bolts 12 or otherwise a condenser, which comprises as herein shown a cylinder 13 provided with headers 14, 15, through which extend a plurality of tubes 16, whose lower ends open into the casing 10 and whose upper ends open into a chamber 17 formed by the cap or dome 18, which is secured to the cylinder 13.

The casing 10 has extended through its opposite end walls 19, 20, a tube 21 of bronze or other non-magnetic material, which forms the cylinder of a pump, having a reciprocating piston, comprising an iron rod 22, having a central longitudinally extended bore 23, and a slot or opening 24 leading from said bore to the outside of the piston between the ends of the latter and within the casing 10, so as to communicate with a pipe or tube 25 extended from the cylinder 21 into the casing 10. The piston 22 is reciprocated in the cylinder 21, as will be described; and is guided in its movements by a pin 26, which projects into a slot 27 in the cylinder 21.

Figure 1:
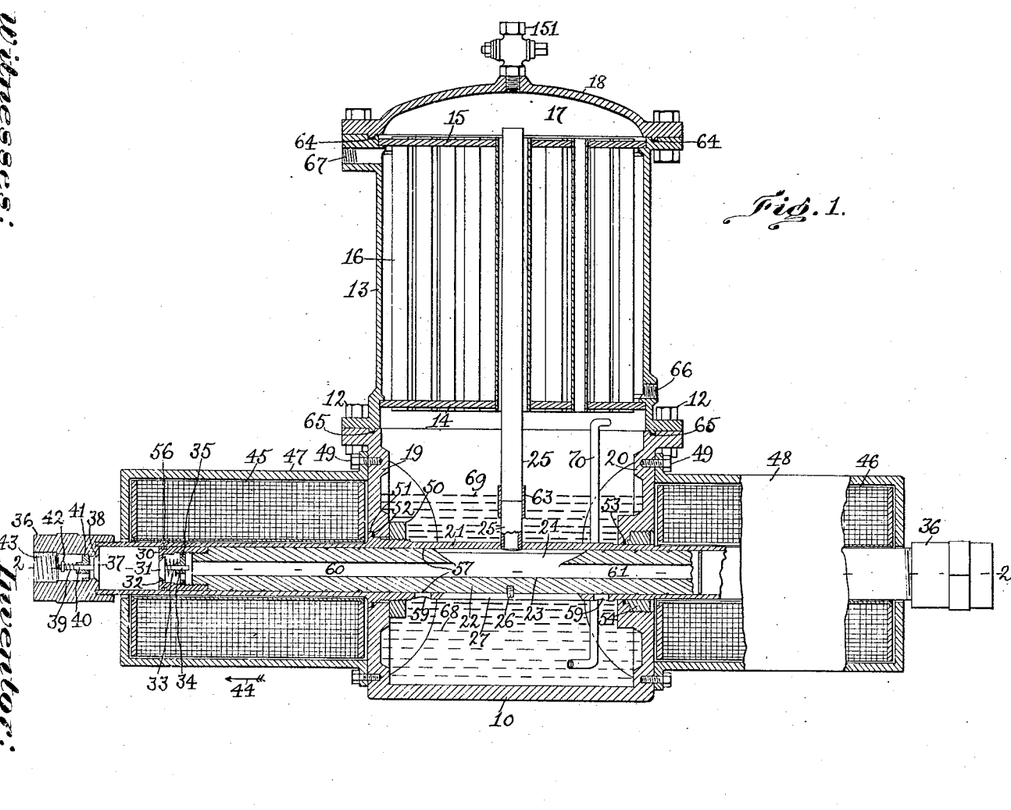
Figure 1 is a vertical longitudinal section of a refrigerating apparatus embodying this invention.

The piston 22 has secured to its opposite ends, valve casings 30 of like construction and only one of which is herein shown. Each valve casing 30, as herein shown, is screwed upon the reduced threaded end of the piston, see Fig. 1, and contains a valve 31, which normally closes a port 32 in the end wall of the casing. The valve 31 is held to its seat by a spring 33, which encircles the stem 34 of the said valve, between the latter and a guiding and supporting wall or spider 35 within the valve casing. The valve 31 is moved within the valve casing 30 to open the port 32 as will be described. The cylinder 21 has secured to its opposite ends valve casings 36, see Fig. 1, which are of like construction, and each is provided with a valve 37, controlling a port 38 in the end wall of the casing adjacent to the cylinder 21, said valve being normally seated by a spring 39, which encircles its stem 40 between a guiding and supporting spider 41 and a nut 42 on said valve stem. The valve 37 is moved into the cylinder 21 to open the port 38, as will be described. The valve casings 36 are provided at their outer ends with pipe engaging screw threads 43. The valve 37 shown in Fig. 1 is closed when the piston 22 is moved in the direction of the arrow 44, and is opened when the said piston is moved in the opposite direction. The cylinder 21 is of bronze or other non-magnetic material, and the piston is of iron or steel or other magnetic material, and the latter constitutes the core of two solenoids 45, 46, whose spools or windings surround the ends of the cylinder 21, which projects beyond the opposite end walls 19, 20 of the casing 10, and said spools are covered by caps 47, 48 of magnetic material, which are secured as by bolts 49 to said end walls.

The cylinder 21 of the pump may be secured in fixed relation to the casing 10, as herein shown, by means of a nut 50, which engages a threaded portion of the cylinder 21 within the casing, and which coöperates with the inner surface of the end wall 19 to draw a flange 51 on the cylinder against the outer surface of said end wall. A fluid tight joint is obtained by means of a lead washer 52 interposed between the flange 51 and the end wall 19. A fluid tight joint around the opening in the end wall 20 through which the cylinder 21 is passed, may be effected by a lead washer 53 and nut 54, which latter is externally threaded and engages a threaded enlargement of the said opening.

Fluid tight joints between the valve casings 35 and the interior of the cylinder 21, may be obtained by packing or piston rings 56 carried by said valve casings, and the piston 22 may and preferably will be provided with annular grooves 57 for the reception of lubricant, which is supplied from the casing 10 through ports or openings 59 in the cylinder 21.

The portions 60, 61 of the central bore 23 of the piston 22, which are located on opposite sides of and communicate with the intermediate port or slot 24 in said piston, constitute, in the present instance, inlet passages for the piston, through which fluid refrigerant passes to the common outlet port 24, from which it passes out of the pump cylinder 21 to the outlet pipe 25. The outlet pipe 25 is preferably made in two sections connected together by a sleeve 63, the upper section being extended up through the condenser and opening into the chamber 17, into which the gaseous refrigerant is discharged and from which it passes down through the condenser tubes 16, and as a liquid into the casing 10.

The chamber 17 is rendered fluid tight by a lead gasket or washer 64, interposed between the cover 18 and the condenser 13, and a fluid tight joint between the condenser and the casing 10 is obtained by means of a lead washer 65. The condenser 13 is provided with an inlet port 66 and with an outlet port 67 for water or other condensing fluid. The apparatus above described is capable of using any desired refrigerant with proper selection of metals according to the refrigerant used, but as hereinafter shown it is adapted for use with refrigerants heavier than the lubricant used, such as sulfur dioxid, and the like, with which a refrigerating apparatus of relative large refrigerating capacity may be made of minimum size and at a minimum cost. The refrigerant in liquid form is supplied to the casing 10 up to about the dotted line 68, and the fluid lubricant, such as a neutral oil, is supplied to the casing up to about the dotted line 69 and floats upon the liquid refrigerant. It will be observed that the portion of the pump cylinder 21 within the casing 10 is surrounded by or immersed in the fluid lubricant 69, which comes in contact with the reciprocating piston 22 through the ports 57 and slot 27, and thereby thoroughly lubricates the said piston. When a refrigerant heavier than the lubricant is used, as in the present case, the casing 10 is provided with an outlet pipe 70 for the liquid refrigerant, which extends down to near the bottom of the casing 10 and is in open communication with the latter. The liquid outlet pipe 70 is connected outside of the casing with an expansion chamber, of any suitable or usual construction and herein shown as a coil 71 of pipes, see Fig. 3, which has its outlet end connected with the valve casings 36.

Figure 3:
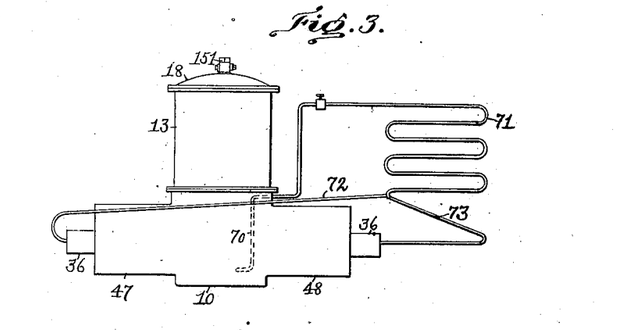
Fig. 3, an elevation of the apparatus shown in Fig. 1, with the expansion chamber connected therewith.

In Fig. 3 the expansion coil 71 is shown as provided with branch outlet pipes 72, 73 which are connected with the valve casings 36 at the opposite ends of the pump cylinder 21.

By reference to Figs. 1 and 3, it will be seen that a circuit is provided for the refrigerant from the casing 10, through the pipe 70 to the expansion chamber 71, through the latter and the branch outlet pipes 72, 73 to the pump cylinder 21, and thence through the passages 60, 61, port 24 in the piston 22, and pipe 25 into the chamber 17, and thence through the condenser back to the casing 10, and that this circuit is hermetically sealed and free from stuffing boxes and the like.

The piston 22 is reciprocated by alternately energizing the solenoids 45, 46, which may be effected in any desired manner, and as the piston 22 is moved in the direction of the arrow 44 by energizing the solenoid 45, the gaseous refrigerant admixed with more or less lubricant and contained in the pump cylinder 21 between the piston 22 and the valve 37, is compressed by the piston on its movement in the direction of the arrow 44 until the pressure of the refrigerant exceeds the strength of the spring 33, and the pressure in the chamber 17, whereupon the gaseous refrigerant under pressure opens the valve 31 and passes through the inlet passage 60 of the piston to the outlet port 24 thereof, and thence passes through the outlet pipe 25 for the pump cylinder 21 into the chamber 17, from which it passes down through the condenser 13 and is converted into liquid, which descends by gravity into the casing 10 and passes through the body of fluid lubricant 69 to the lower part of the casing.

Figure 2:
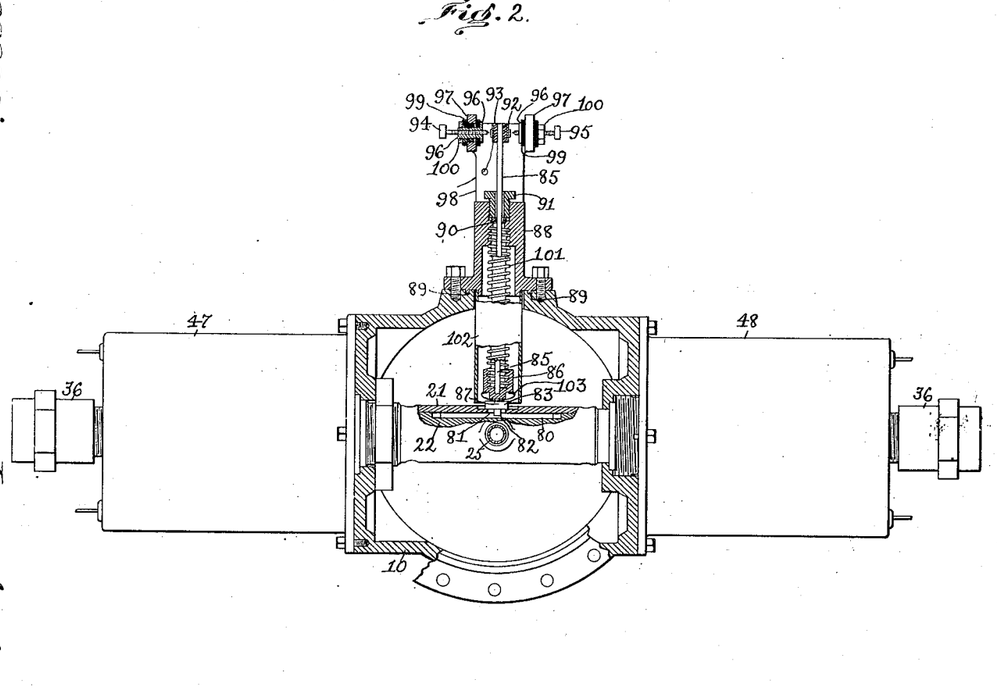
Fig. 2, a horizontal section and plan of the apparatus shown in Fig. 1, the section being taken on the line 2—2.

The piston 22 on its stroke in the direction of the arrow 44 compresses the gaseous refrigerant at one end of the cylinder, and simultaneously draws into the opposite end of the cylinder gaseous refrigerant from the expansion chamber. On the stroke of the piston 22 in the direction opposite to that indicated by the arrow 44, which is effected by energizing the solenoid 46, the gaseous refrigerant in the cylinder 21 at its right hand end viewing Fig. 1, is compressed and forced through the passage 61 in the piston and out through the port 24 and pipe 25 to the condenser, wherein it is condensed and returns to the casing 10 as above described, while at the same time gaseous refrigerant is drawn by the piston into the left hand end of the cylinder 21 from the expansion chamber 71 through the branch pipe 72. It will thus be seen, that a substantially continuous circulation of the refrigerant is effected through the circuit above described, by the reciprocating pump. It will be understood that the solenoids 45, 46 are alternately energized, and in the present instance I have shown one arrangement or construction for effecting this result by the reciprocating piston 22. To this end, the piston 22 is provided on its circumference with a longitudinally extended slot 80, which is located, as shown in Fig. 2, substantially at right angles to the outlet port 24 in said piston. The slot 80 has extended into it through a slot 81 in the cylinder 21, a lug or projection 82 on a block 83, which slides in an enlargement of the slot 81. The lug or projection 82 is designed to be engaged by the end walls of the slot 80 in the piston, so as to move the said lug in opposite directions from a central position in the said slot. The slide block 83 has connected with it a contact carrier, one form of which is herein shown, and comprises a rod 85 having at its lower end a cap 86, which is connected with the slide block to move therewith, and is shown as provided with a pin 87 fitted into a socket in said block. The rod 85 is extended through a bonnet 88 attached to the casing and rendered fluid tight by a lead washer 89, and said rod is inserted through a disk 90, having a knife edge wall to an opening therethrough, which forms a fulcrum for the rod 85. The disk 90 is retained in a socket in the bonnet 88 by a bushing 91.

The rod 85 has secured to its outer or free end a contact ring 92, provided with contact points substantially diametrically opposite, and said ring is separated from the rod 85 by the insulating bushing 93. The contact ring 92 forms a movable switch member, which coöperates with terminal screws 94, 95, adjustable in metal sleeves 96, which are supported by lugs or ears 97 on a bracket 98 attached to the bonnet 88, the sleeves 96 being insulated from the ears 97 by insulation 99, which is held in place by flanges on the sleeves 96 and by nuts 100.

The cap 86 has soldered or brazed to it one end of a flexible corrugated metal tube 101, which has its other end soldered to the end of the bonnet 88, and prevents escape of the refrigerant along the rod 85, and the corrugated tube 101 may be inclosed by a protecting tube 102, which is brazed to the bonnet 88. The contact carrier or rod 85 is turned on its fulcrum, by the end walls of the slot 80 in the piston 22 engaging the lug or projection 82, and the sliding block 83 is kept seated in the enlarged portion of the slot 81 by the spring 103, interposed between the cap 86 and the sliding block 83. The contact member 92 and the terminal screw 94 constitute a circuit controller for the solenoid 45, and the contact member 92 and terminal screw 95 constitute a circuit controller for the solenoid 46, as will be described.

It will be observed that the reciprocating pump including the piston 22, the cylinder 21, and the valves for both, may be assembled together outside of the casing 10, and as a complete pump can be pushed through the end walls of the casing and secured in position by the nuts 50, 54. The tubes 16 are brazed or soldered into the plates or headers 14, 15 and the latter are brazed or soldered to the cylinder or shell 13. The switch member 92, which is operated by the pump piston 22, preferably controls the circuits of two relays or electromagnets, which in turn control the circuits of the solenoids as will be described.

Figure 4:
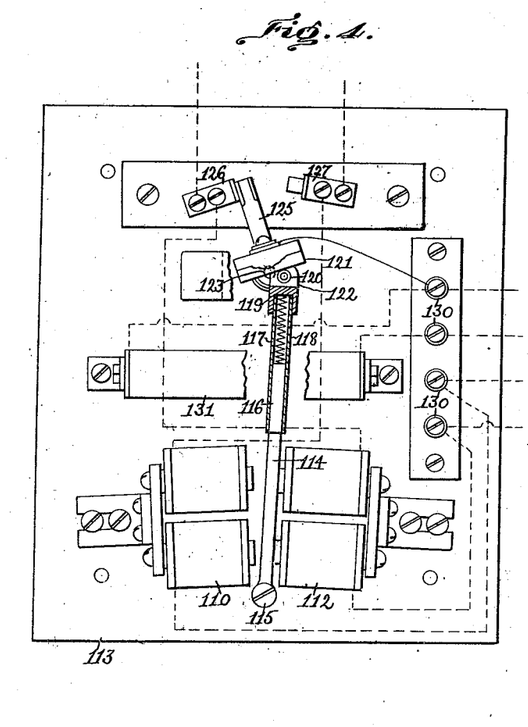
Figs. 4 and 5, details of a circuit controller for alternately energizing the solenoids.
Figure 5:
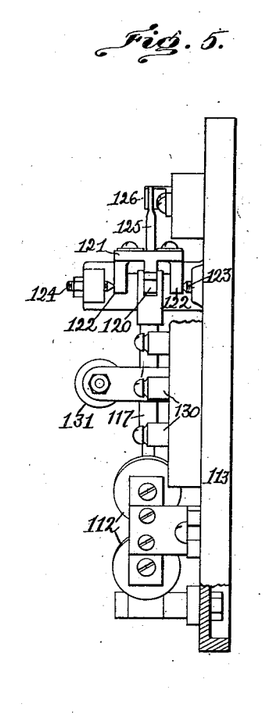

In the present instance I have illustrated in Figs. 4 to 11 inclusive, one arrangement or construction of switch or circuit controller operated by relays. Referring to Fig. 4, 110, 112 represent two electromagnets or relays, which are mounted upon a suitable base or board 113, and have a common armature 114, which is pivoted at 115, and has its free or upper end made as a cylindrical rod 116, on which slides a metal tube 117, containing a spring 118 and having a forked head 119 carrying a roller 120. The roller 120 engages the underside of a contact carrier, which is shown as a plate or bar 121, provided with side ears 122, which are pivotally mounted on center points or screws 123, 124. The bar 121 has secured to it a movable member 125 of a switch, which coöperates with terminals or contact arms 126, 127 located on opposite sides thereof, so that when one of the relays as 110 is energized, the contact member 125 is moved into engagement with the terminal 127, by the roller 120 passing beyond the center or pivot points 123, 124, so as to turn the carrier 121 in the reverse direction to that in which the armature 114 is moved. When the other relay as 112 is energized, the armature 114 is attracted, and the contact carrier 121 is moved in the opposite direction and is engaged with the terminal 126. The base or board 113 may and preferably will be provided with suitable binding posts 130, and may and preferably will have secured to it a resistance coil 131, which is electrically connected with the movable member 125 of the relay switch, and with the movable member 92 of the switch operated by the pump piston 22.

Figure 6:
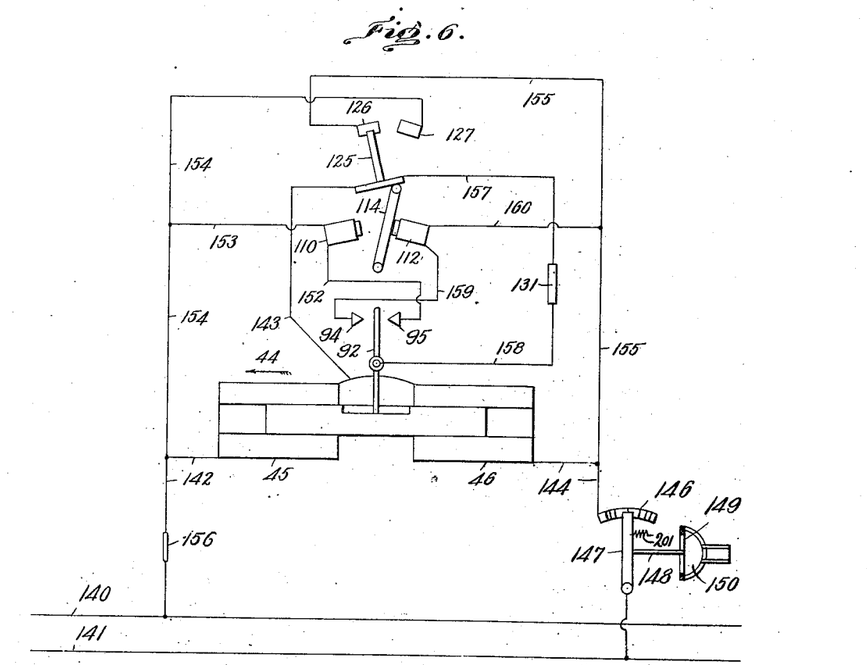
Figs. 6 to 11 diagrammatic views to enable the operation of the circuit controller to be readily understood.
Figure 7:
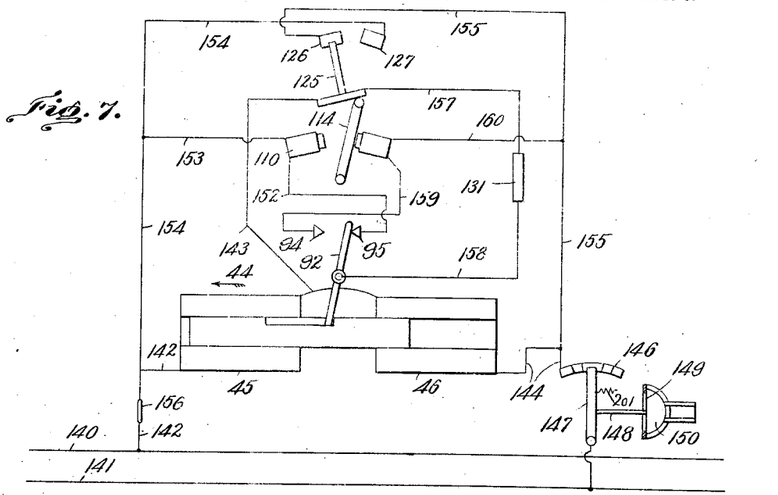
Figure 8:
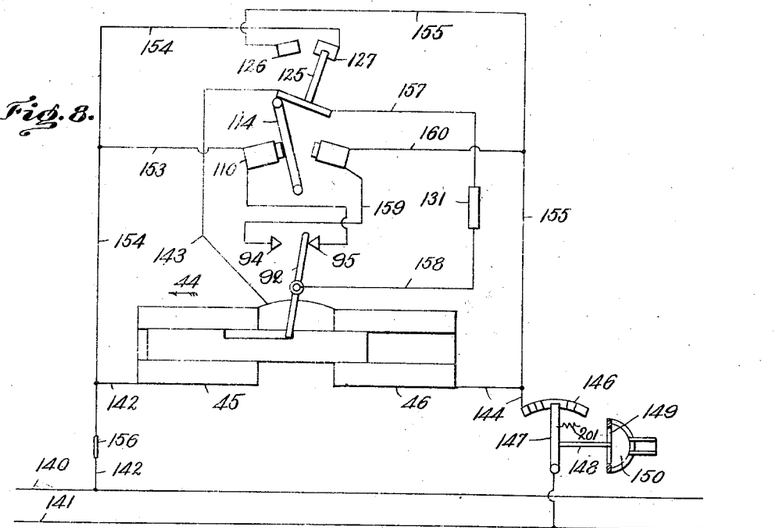
Figure 9:
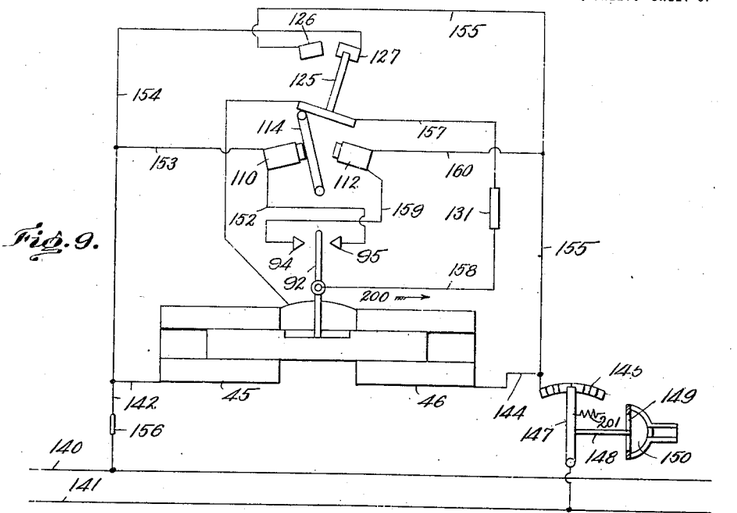

To enable the operation of the switch mechanisms to be readily understood, I have represented the operating parts diagrammatically in Figs. 6 to 11 inclusive. Referring to Fig. 6, 140, 141 represent the main line wires of the supply circuit. The solenoid 45 has one end of its coil connected by wire 142 with the line wire 140, and the other end of its coil connected by wire 143 with the movable member 125 of the relay switch. The solenoid 46 has one end of its coil connected with the wire 143 and the other end with the line wire 141, which may be effected by a wire 144, resistance 146 and switch arm 147, the latter being represented as connected by a link 148 with a diaphragm 149, which closes a pressure chamber 150, which is designed to be attached to the cock 151 shown in Fig. 1, for a purpose as will be described. The relay 110 has one end of its coil connected by wire 152 with the terminal or contact member 95, and its other end connected by wire 153 with the wire 154, which connects the wire 142 with the terminal or contact member 127. The terminal member 126 is connected by wire 155 with the wire 144. The wire 142 may be provided with a suitable hand operated starting switch 156. The switch member 125 is connected by wire 157 with one end of the resistance 131, whose other end is connected by wire 158 with the switch member 92. The terminal 94 of the switch operated by the pump piston 22, is connected by wire 159 with the relay 112, which is connected by wire 160 with the wire 155, connected with the wire 144. As above explained, when the solenoid 45 is energized, the switch member 92 is engaged with the terminal member 95, near the end of the piston stroke, and when the solenoid 46 is energized, the switch member 92 is engaged with the terminal member 94 near the end of the piston stroke in the opposite direction. When the relay 110 is energized, the switch member 125 is engaged with the terminal member 127, and when the relay 112 is energized the switch member 125 is engaged with the terminal member 126. When the switch member 125 is engaged with the terminal member 126, the circuit of the solenoid 45 is completed. This circuit may be traced as follows: from the line wire 140 by wire 142, solenoid 45, wire 143, switch member 125, terminal 126, wires 155, 144, resistance 146, arm 147 to the line wire 141. The solenoid 45 thus energized moves the pump piston 22 in the direction of the arrow 44 in Figs. 1 and 6, and at the end of this movement of the pump piston, the switch member 92 is moved by the piston into contact with the terminal 95 and the circuit of the relay 110 is closed. This circuit may be traced in Fig. 7 as follows: from the line wire 140, by wires 142, 154, 153, relay 110, wire 152, contact 95, switch member 92, wire 158, resistance 131, wire 157, switch member 125, terminal 126, wires 155, 144, resistance 146, arm 147 to the line wire 141. The relay 110 thus energized, attracts its armature 114, thereby moving the switch member 125 into contact with the terminal 127, so as to complete the circuit through the solenoid 46 and open the circuit of the solenoid 45. This condition is represented in Fig. 8.

Figure 10:
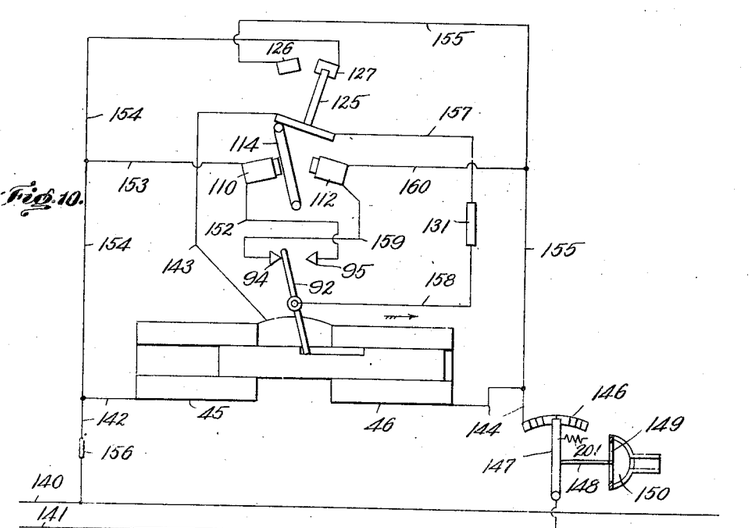
Figure 11:
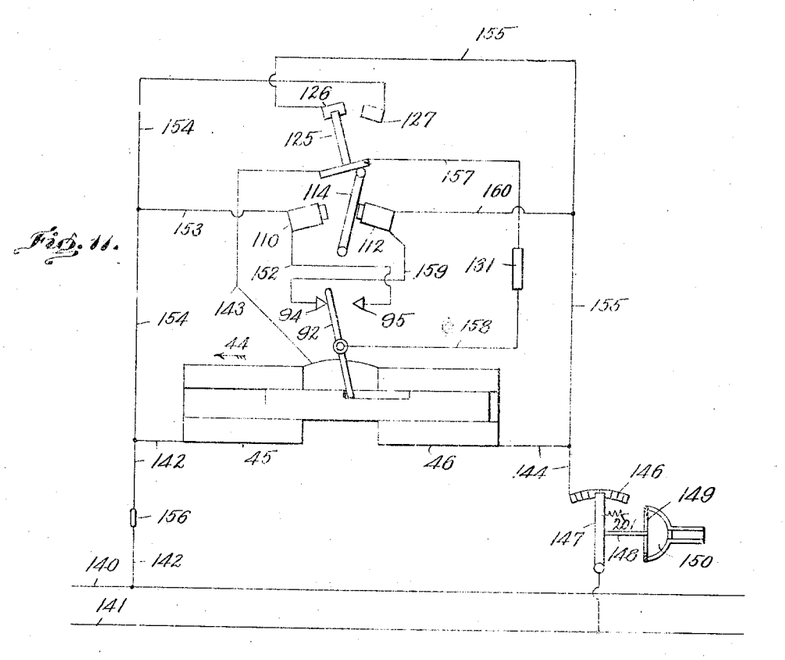

Arcing between the switch member 125 and the terminal 126, when the switch member leaves the said terminal, is avoided by the circuit through the relay 110, which is completed between the switch member 92 and the terminal 95. The circuit of the solenoid 46 may be traced in Fig. 8 as follows: from the line wire 140 by wires 142, 154, terminal 127, switch member 125, wire 143, solenoid 46, wire 144, resistance 146, arm 147 to line 141. The solenoid 46 attracts the piston 22 and moves it in the direction of the arrow 200 in Fig. 9, and when the piston leaves the switch member 92, the latter may remain in contact with the terminal 95 or it may be returned by the spring 103 to its central position shown in Figs. 2 and 9. At the end of the movement of the piston 22 in the direction of the arrow 200 in Fig. 9, the piston moves the switch member 92 into contact with the terminal 94, and closes the circuit of the relay 112 as shown in Fig. 10. This circuit may be traced as follows: from the line wire 140 by wires 142, 154, terminal 127, switch member 125, wire 157, resistance 131, wire 158, switch member 92, contact 94, wire 159, relay 112, and wires 160, 155, 144, resistance 146, arm 147, to line 141. The relay 112 attracts its armature 114 and moves the switch member 125 into engagement with the terminal 126, thereby completing the circuit of solenoid 45. This circuit may be traced in Fig. 11, as follows: from line wire 140 by wire 142, solenoid 45, wire 143, switch member 125, terminal 126, wires 155, 144, resistance 146, arm 147 to line 141. While the switch member 125 is moving from terminal 127 to 126, the circuit through the relay 112 remains closed, and arcing at the relay switch is avoided. The solenoid 45 being energized moves the piston 22 in the direction of the arrow 44 in Fig. 11, and as soon as the piston leaves the switch member 92, the latter may be left in engagement with contact 94 or it may be returned to its central position, in which case the parts are in the position indicated in Figs. 1 and 6. Arcing between the switch member 92 and its terminals 94, 95, is prevented by the circuits through the solenoids 45, 46 being completed before the switch member 92 leaves its coöperating terminals. The switch arm 147 is moved over the resistance 146 in one direction by an increase in pressure in the apparatus and in the opposite direction by the spring 201. The resistance 146 is cut out of the solenoid circuit as the temperature of the condensing water rises and the pump pressure increases, and is added to said circuit when the said temperature decreases. In this manner the use of a minimum amount of current at all times is insured. The apparatus herein shown has the advantage of being able to start under full load, and with the expansion chamber and the pump flooded with liquid refrigerant, because the conditions of starting up under full load are the same as during any stroke of continuous operation, and the only effect of liquid in the cylinder would be the slowing down of the pump, until the pump ejected the liquid and cleared itself. In practice the electrically operated pump may be controlled in a manner well understood by a thermostat not shown, but which may be represented by the switch 156, and which will be located in the chamber of the refrigerator or other receptacle (not shown).

In the present instance I have shown one embodiment of the invention, but it is not desired to limit the invention to the particular construction shown. From the above description it will be seen that the expansion chamber or coil 71 is included in a hermetically sealed circuit, which contains a piston, which is movable in a portion of the said circuit, by means extraneous to the portion of the circuit in which the piston is located, and that this movement of the piston is effected without breaking the seal of the circuit, which avoids the use of stuffing boxes and the disagreeable results and necessary attendance which flow from the use of stuffing boxes. Furthermore the working parts are inclosed and automatically lubricated and are protected from being tampered with, thereby rendering the refrigerating apparatus or system fool proof, and especially adapting it for use in households. So also, the expansion chamber is stationary and accessible for repairs and can be made of any desired or required size.

Claims:

1. In a refrigerating apparatus, in combination, a substantially fluid tight stationary casing for containing liquid refrigerant, a pump having its cylinder extended through walls of said casing and secured in fixed relation thereto, and provided with inlet ports outside of said casing and with an outlet port within said casing, a piston reciprocating in said cylinder, electromagnetic means for reciprocating said piston and an expansion chamber connected with said casing and with the said fluid inlet ports.

2. In a refrigerating apparatus, in combination, a casing, a multitubular condenser supported by said casing, a cap for said condenser forming a chamber therewith, a pump cylinder located in said casing and having a fluid inlet outside of said casing and having an outlet pipe extended through the condenser into said chamber, an expansion chamber outside of said casing and connected therewith and with said fluid inlet, and means for operating said pump.

3. In a refrigerating apparatus, in combination, a casing, an expansion chamber located outside of said casing, a reciprocating pump having its cylinder extended into said casing and provided with an outlet communicating with said casing, a piston reciprocating in said cylinder and having a fluid inlet and a fluid outlet passage, and an electromagnet located outside of said casing for moving said piston in one direction, substantially as described.

4. In a refrigerating apparatus, in combination, a casing for containing a liquid refrigerant and a fluid lubricant, an expansion chamber connected with said casing, a pump cylinder extended through an end wall of said casing into the latter below the level of the fluid lubricant, a piston reciprocating in said cylinder, and means located outside of said casing for reciprocating said piston.

5. In a refrigerating apparatus, in combination, a casing for containing a liquid refrigerant and a fluid lubricant, a pump cylinder extended through an end wall of said casing and into the body of lubricant, said cylinder having a fluid inlet outside of said casing and a fluid outlet within the same, an expansion chamber connected with said casing and with said fluid inlet, a piston reciprocating within said cylinder, and an electromagnet located outside of said casing for moving said piston in its cylinder in one direction, substantially as described.

6. In a refrigerating apparatus, in combination, a casing for containing liquid refrigerant, an expansion chamber located outside of said casing and having a fluid inlet communicating with said casing to receive liquid refrigerant therefrom, a pump cylinder extended through side walls of said casing and provided with fluid inlets at its opposite ends outside of said casing and having a fluid outlet within said casing, means for connecting said expansion chamber with said fluid inlets, a hollow piston reciprocating in said cylinder and provided with fluid inlets at its opposite ends and with a fluid outlet between its ends and within said casing, and electromagnets for moving said piston in opposite directions, substantially as described.

7. In a refrigerating apparatus, in combination, a casing for containing liquid refrigerant, an expansion chamber located outside of said casing and having a fluid inlet communicating with said casing to receive liquid refrigerant therefrom, electromagnetic pumps having their cylinders extended into and outside of said casing, and connected with said expansion chamber to receive refrigerant therefrom and communicating with said casing to discharge the refrigerant thereinto, and means for alternately energizing said pumps to effect a substantially continuous circulation of refrigerant through the apparatus.

8. In a refrigerating apparatus, in combination, a casing for containing liquid refrigerant, an expansion chamber located outside of said casing and having a fluid inlet communicating with said casing to receive liquid refrigerant therefrom, electromagnetic pumps having their cylinders supported by said casing and extended outside thereof and connected with said expansion chamber to receive refrigerant therefrom and communicating with said casing to discharge the refrigerant thereinto, and means for alternately energizing said pumps to effect a substantially continuous circulation of refrigerant through the apparatus.

In testimony whereof, I have signed my name to this specification in the presence of two subscribing witnesses.

CYRUS H. HAPGOOD.

Witnesses:
 JOHN L. COX,
 JOSEPH MARTIN.